United States Patent Office 3,346,642
Patented Oct. 10, 1967

3,346,642
PROCESS FOR THE PREPARATION OF DIFLUORAMINO ETHERS
Samuel Franklin Reed, Jr., Huntsville, Ala., assignor to Rohm & Haas Company, Philadelphia, Pa., a corporation of Delaware
No Drawing. Filed May 24, 1963, Ser. No. 283,109
7 Claims. (Cl. 260—584)

This invention concerns processes for the preparation of organic compounds containing $NF_2$ groups. More particularly, it concerns processes for the preparation of $NF_2$-containing ethers by the reaction of tetrafluorohydrazine, $N_2F_4$, with ethers at elevated temperatures.

The utility of the compounds produced by the process of the present invention varies with the molecular weight of the ethers employed as the reactant with $N_2F_4$. For instance, the sym-bis(difluoroamino) ethers prepared by the reaction of $N_2F_4$ with dimethyl and diethyl ethers are suitable for propellant applications in that they have high specific impulse. Of particular interest as a storable monopropellant is $NF_2CH_2OCH_2NF_2$, which compound has a calculated specific impulse of 300. It can also be used as an oxidizer in propellant formulations.

The higher ethers, on treatment with $N_2F_4$, give a variety of products which constitute a complex mixture, but these mixtures need not be separated to be used as solvents for nitrogen-containing polymers which are high energy polymers, or for plasticizers for the same type of compounds. As indicated, the lower dialkyl ethers give the preferred products for propellant applications.

In carrying out the process of the present invention, it is preferred to react the reactants in the vapor phase, and the mixture of the ether and $N_2F_4$, preferably in the presence of an inert diluent gas, is passed through a heated reactor coil and the product is collected in a cooled receiver.

Insofar as the ethers are concerned, a wide variety of ethers will undergo reaction with $N_2F_4$, and alkyl ethers with $C_{1-10}$, can be employed. Preferred are the dialkyl ethers in which the alkyl group is $C_{1-10}$, and particularly preferred are dimethyl and diethyl ethers.

The preparation of tetrafluorohydrazine, $N_2F_4$, is well-known, and one method of preparing it has been set forth in Colburn et al., JACS 80, 5004 (1958). The preparation of $N_2F_4$ does not concern this particular invention.

As the inert diluent gas, nitrogen, helium and argon can be employed. In general, the inert diluent is present to the extent of 10% to 20% of the gaseous phase, but particularly with some of the higher molecular weight ethers, whose reactions are more sluggish, the diluent can be omitted. One of the important reasons for the use of the diluent is to facilitate the removal of the products from the reactor.

Using a copper reactor tube, a temperature range of 250° to 400° C. can be employed. The temperature range of 250° to 300° C. is a particularly preferred range.

It is preferred to use an excess of $N_2F_4$ since such an excess favors the formation of bis(difluoramino) compounds and any unreacted $N_2F_4$ can be readily recovered. The molar ratio of ether to $N_2F_4$ will vary from 1 to 5 to 5 to 1. With dimethyl ether, for instance, with an excess of $N_2F_4$, the compound previously set forth, $$NF_2CH_2OCH_2NF_2$$

can be produced in good yield, but, if a low molar ratio is employed, the mono-difluoramino compound, $$NF_2CH_2OCH_3$$

will be the main product. However, this mono-difluoramino compound is also of interest as a monopropellant since it has a calculated specific impulse of 285. It can also be used as an oxidizer in propellant formulations.

Dimethyl ether is reacted with excess tetrafluorohydrazine to give a mixture of 18 to 20 components. The experimental conditions for these reactions are described in Table I:

TABLE I.—EXPERIMENTAL DATA FOR DIMETHYL ETHER (DME)-TETRAFLUORO HYDRAZINE REACTIONS

| Flow Rates (cc./min.) | | | Temp., °C. | Time (min.) | Product |
|---|---|---|---|---|---|
| DME | $N_2F_4$ | Helium | | | |
| 40 | 50 | 25 | 250 | 30 | Clear liq. prod. |
| 50 | 50 | 20 | 250 | 40 | Do. |
| 25 | 20 | 20 | 350 | 30 | Do. |
| 10 | 40 | 15 | 300 | 50 | Do. |
| 10 | 65 | 15 | 300 | 39 | Do. |
| 10 | 65 | 15 | 300 | 41 | Do. |
| 5 | 40 | 15 | 275 | 18 | Do. |
| 5 | 67 | 40 | 350 | 20 | Do. |
| 5 | 73 | 20 | 370 | 20 | Do. |
| 5 | 73 | 25 | 325 | 20 | Do. |
| 5 | 73 | 20 | 250 | 21 | Do. |
| 5 | 80 | 10 | 250 | 25 | Do. |
| 5 | 73 | 20 | 250 | 25 | Do. |
| 5 | 70 | 20 | 250 | 30 | Do. |
| 5 | 73 | 20 | 250 | 32 | 2.1 g. prod. mix. |
| 5 | 73 | 25 | 250 | 36 | 1.75 g. prod. mix. |
| 5 | 73 | 20 | 250 | 38 | 2.3 g. prod. mix. |
| 5 | 73 | 20 | 250 | 40 | 3.2 g. prod. mix. |
| 5 | 73 | 20 | 250 | 40 | 2.1 g. prod. mix. |
| 10 | 73 | 20 | 250 | 41 | 2.2 g. prod. mix. |
| 5 | 73 | 20 | 250 | 41 | 2.7 g. prod. mix. |
| 5 | 70 | 20 | 250 | 43 | 2.7 g. prod. mix. |

The reaction mixtures were first examined by gas chromatography which showed the presence of numerous components. Distillation, as a means of product separation, was ruled out due to the small quantities involved and complexity of the mixtures. Gas chromatography was selected as a means of separating the major reaction components. A typical chromatogram of a product mixture is described in Table II where the data for component retention time relative to air, component peak area (percent) and a qualitative comparison is presented. Several extremely minor peaks were omitted. The products which have been separated and identified are listed in Table III along with confirming analytical data. Only the more highly substituted products are of interest in propellant application.

TABLE II.—GAS CHROMATOGRAPHY DATA FOR TETRAFLUOROCHYDRAZINE-DIMETHYL ETHER REACTION MIXTURES [1]

| Component No.[2] | Relative Retention Time | Peak Area (percent) | Quantity |
|---|---|---|---|
| 1[3] | 1.5 | 2.7 | Intermediate. |
| 2 | 2.0 | 0.2 | Minor. |
| 3[3] | 2.5 | 4.5 | Intermediate. |
| 4[3] | 2.75 | 2.3 | Do. |
| 5[3] | 3.25 | 8.5 | Do. |
| 6[3] | 4.25 | 59.4 | Major. |
| 7 | 5.75 | | Minor. |
| 8[3] | 7.5 | 4.6 | Intermediate. |
| 9 | 8.5 | | Minor. |
| 10 | 10.5 | 0.1 | Do. |
| 11 | 11.25 | | Do. |
| 12 | 16.0 | | Do. |
| 13 | 19.25 | 0.3 | Do. |
| 14[3] | 23.5 | 0.3 | Intermediate. |
| 15 | 33.0 | 9.8 | Minor. |
| 16[3] | 42.0 | 1.2 | Do. |
| 17[3] | 62.0 | 5.9 | Intermediate. |

[1] Separated on Dinonyl Phthalate on chromosorb (Reg. 35/85) column at 74° C.
[2] Retention times relative to air.
[3] Components separated.

TABLE III.—PRODUCT CHARACTERIZATION DATA ON DIMETHYL ETHER-TETRAFLUOROHYDRAZINE REACTION MIXTURES

| Component No.[1] | Structure | Elemental Analysis (Calc'd/Found) | | | | N.M.R. $F^{19}$ Spectral Data[2] |
|---|---|---|---|---|---|---|
| | | Percent C | Percent H | Percent F | Percent N | |
| 6 | $CH_3OCH_2NF_2$ | 24.75/25.00 | 5.15/5.50 | 39.18/38.01 | 14.41/14.38 | Triplet centered at −4,440 cycles. |
| 8 | $FCH_2OCH_2NF_2$ | 20.87/21.07 | 3.48/3.31 | 49.63/49.19 | 12.19/12.76 | Triplet centered at −4,508 cycles. Triplet centered at +2,977, +3,034, +3,087 cycles. |
| 14 | $F_2NCH_2OCH_2NF_2$ | 16.20/16.92 | 2.70/3.21 | 51.32/49.0 | 18.94/19.02 | Triplet centered at −4,408 cycles. |
| 17 | $HOCH_2NF_2$ | 14.45/15.25 | 3.62/4.22 | 45.75/44.1 | 16.85/17.61 | Triplet centered at −4,281 cycles. |

[1] Number corresponds to that given in Table II.
[2] Trifluoroacetic acid used as reference.

The reaction of tetrafluorohydrazine with diethyl ether gave a more complex reaction mixture. A total of twenty-eight components were present in this mixture. The experimental reaction data is presented in Table IV and the product characterization data is presented in Table V.

TABLE IV.—EXPERIMENTAL DATA FOR DIETHYL ETHER (DEE)-TETRAFLUOROHYDRAZINE REACTIONS

| Flow Rates (cc./min.) | | | Temp., °C. | Time (min.) | Product |
|---|---|---|---|---|---|
| DEE (liquid) | $N_2F_4$ | Helium | | | |
| 0.2 | 50 | 25 | 250 | 41 | Clear product mixture. |
| 0.2 | 55 | 20 | 250 | 43 | Do. |

TABLE V.—PRODUCT CHARACTERIZATION DATA ON TETRAFLUOROHYDRAZINE-DIETHYL ETHER REACTION MIXTURES

| No. | Structure | Elemental Analysis (calc'd/found) | | | | N.M.R. $F^{19}$ Spectral Data[1] |
|---|---|---|---|---|---|---|
| | | Percent C | Percent H | Percent F | Percent N | |
| 1 | $CH_3CHOCH_2CH_3$<br>\|<br>$NF_2$ | 38.45<br>38.68 | 7.2<br>7.51 | 30.20<br>39.10 | 11.2<br>12.61 | Triplet centered at −4,150 cycles. |
| 2 | $CH_3CH_2-O-CH_2CH_2NF_2$ | 38.45<br>37.06 | 7.2<br>7.11 | 30.20<br>31.2 | 11.2<br>12.34 | Triplet centered at −4,180 cycles. |
| 3 | $CH_3CH_2OCH-CH_2NF_2$<br>\|<br>$NF_2$ | 27.24<br>26.85 | 4.54<br>5.38 | 43.20<br>39.30 | 15.92<br>15.13 | Triplet centered at −4,093 cycles. Doublet at approximately −4,190 cycles. |

[1] Trifluoroacetic acid used as reference.

I claim:
1. Process for the preparation of $NF_2$-containing ethers, said ethers being selected from the group consisting of alkyl ethers in which the alkyl is $C_{1-10}$, which comprises reacting the mixture of the said ether and tetrafluorohydrazine at a temperature of 200° to 400° C.

2. Process as set forth in claim 1 in which the reaction temperature is from 250° to 300° C.

3. Process as set forth in claim 1 in which the ether is dimethyl ether.

4. Process as set forth in claim 1 in which the ether is diethyl ether.

5. Process for the preparation of $NF_2$-containing ethers, said ethers being dialkyl ethers in which the alkl group contains from 1 to 10 carbon atoms, which comprises reacting a mixture of an ether, tetrafluorohydrazine, $N_2F_4$, and an inert gas at a temperature of 200° to 400° C.

6. The process as set forth in claim 5 in which the inert gas is selected from the group consisting of nitrogen, argon and helium.

7. The process as set forth in claim 5 where the inert gas represents 10 to 20% by volume of the mixture.

References Cited

UNITED STATES PATENTS 3,103,456   9/1963   Laurton et al. _____ 149—1

CHARLES B. PARKER, *Primary Examiner.*

CARL D. QUARFORTH, *Examiner.*

L. A. SEBASTIAN, B. BILLIAN, *Assistant Examiners.*